June 22, 1937.  F. A. ROGERS  2,084,598
COLOR CALIBRATION MACHINE
Filed April 8, 1935
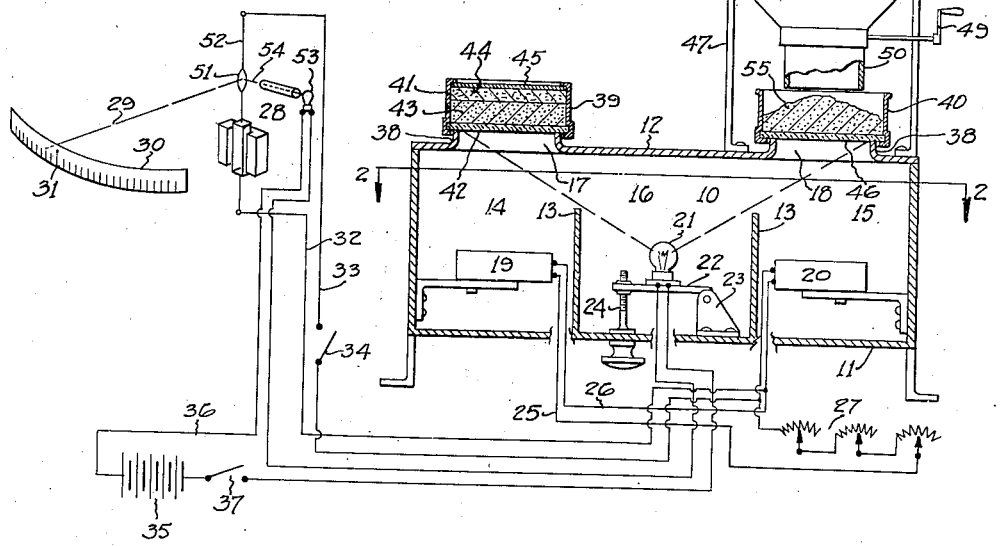
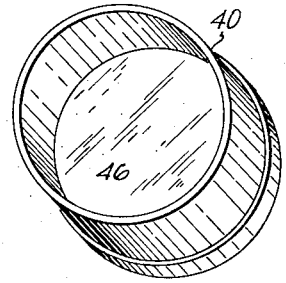
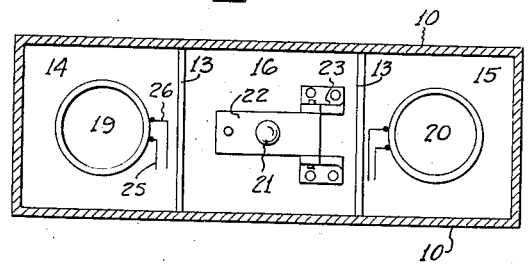
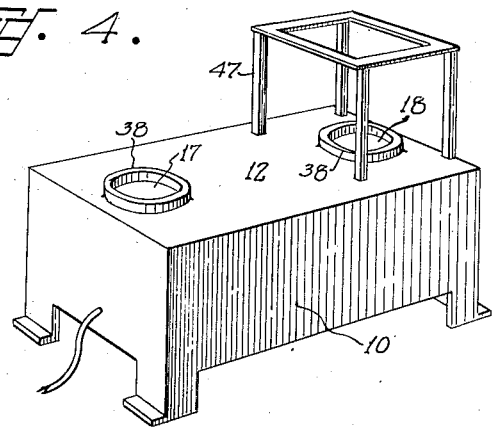
INVENTOR
F. A. ROGERS
BY
ATTORNEY Patented June 22, 1937

2,084,598

UNITED STATES PATENT OFFICE 2,084,598

COLOR CALIBRATION MACHINE

Fred A. Rogers, Portland, Oreg., assignor to Rainbow Laboratories, Portland, Oreg.

Application April 8, 1935, Serial No. 15,158

1 Claim. (Cl. 88—14)

This invention relates generally to the calibration of colors, that is, to the setting up of a standard of values by which colors can be designated and distinguished from each other, and particularly to a color calibrating machine by means of which this is accomplished.

The main object of this invention is the provision of an exceedingly simple and efficient form of color calibrating machine whereby color values may be accurately determined, compared, and established with the utmost precision.

The second object is the construction of a special form of color calibrating machine which lends itself to the calibration of colors in objects in powder form, such as flour, cosmetics, paints, and chemicals.

The third object is to set up a condition wherein a measurement is taken at a time when no current is flowing through the cells in order that the utmost precision may be obtained, and that a variable factor, such as a current flow, cannot affect the accuracy of the reading being taken.

The fourth object is the provision of special form of balancing mechanism whereby a definite or zero balance may be obtained before a comparative reading is taken.

I accomplish these and other objects in the manner set forth in the following specification as illustrated in the accompanying drawing, in which:

Fig. 1 is a longitudinal section through the device showing the wiring in diagram and the balance mechanism in perspective.

Fig. 2 is a horizontal section taken along the line 2—2 in Fig. 1.

Fig. 3 is a perspective view of one of the special powder holding cups.

Fig. 4 is a perspective view of the device without the storage hopper or cups.

Referring in detail to the drawing, there is shown a cabinet consisting of the side walls 10, the bottom 11, and top 12. The dividing walls 13 extend transversely across the cabinet dividing it into three compartments, which are designated as 14 and 15 for the outer compartments and 16 for the inner one.

It will be understood that the three compartments, 14, 15, and 16 are actually joined or connected along the upper edges thereof.

In the top 12 and directly over the outer compartments 14 and 15 are the circular ports 17 and 18. Directly beneath these ports and at a fixed distance therefrom are mounted the photoelectric cells 19 and 20. In the center compartment is mounted an exciter lamp 21 whose base 22 is hinged on a support 23 and is adjustable by means of a screw 24 so as to allow the lamp 21 to be moved in an arc.

The light from the lamp 21 is permitted to shine over the dividing walls 13 through the ports 17 and 18.

The cells 19 and 20 are oppositely connected by means of the wires 25 and 26, that is, the positive pole of the cell 20 is connected to the negative pole of the cell 19, and the positive pole of the cell 19 is connected to the negative pole of the cell 20.

Interposed in the circuit between the cells 19 and 20 and in series therewith is the resistance element 27, the values of which can be made optional. The cells 19 and 20 are connected to a sensitive galvanometer 28, whose needle 29 is adjustable with relation to the scale 30, that is, when no current is flowing between the cells 19 and 20, the needle 29 will point to the zero mark 31.

The galvanometer 28 is connected to the cell wires 25 and 26 by means of the leads 32 and 33, which include a manually operated switch 34.

Energy is supplied to the lamp 21 and the galvanometer 28 by means of a battery 35 through the circuit 36 under the control of a manually operated switch 37.

Surrounding the ports 17 and 18 are the upturned flanges 38 which form supports for the gage holding cup 39 and work holding cup 40. The gage cup 39 consists of a cylindrical shell 41 provided with a transparent bottom 42 upon which is placed a quantity of material such as magnesium oxide 43, upon which is placed a resilient substance 44 which is confined by means of a cover plate 45.

The work holding cup 40 is also provided with a transparent bottom 46 which is of identical thickness and transparency as the bottom 42.

Supported over the port 18 on the standards 47 is a hopper 48 in the bottom of which is placed a sifter, not shown, which is operated by means of a crank 49, and its discharge spout 50 is directly over the cup 40 when placed over the port 18.

Before entering into an explanation of this device, it will be understood that the galvanometer 28 is of a conventional type, and includes a mirror 51 which is mounted on a torsion wire 52, and the lamp 53, which is in the circuit 36, projects its beam of light 54 against the mirror 51, and the reflected ray constitutes the needle 29, and the adjustment of the wire 52 is such that the ray or needle 29 rests at the zero mark 31 when no current is flowing through the circuit 32—33.

Before this device is used to calibrate a color, a pair of identical cups 39 with identical filling substances, such as magnesium oxide 43, are placed over the two ports 17 and 18, the switch 34 being open.

Now if the exciter lamp 21 is energized by closing the switch 37 and the meter switch 34 is closed, and the two cups 39 with identical specimens are placed above the ports 17 and 18 as stated, and all of the conditions being equal, cell 19 will produce the same amount of potential as does cell 20, and the needle 29 will remain at zero.

If the needle 29 has left the zero position, it can be restored thereto by adjustment of the lamp base 22 by means of the screw 24, which will vary the relationship of the amount of light delivered by the lamp 21 to the cups 39.

If it is desired to calibrate the color of some specimen, the standard cup 39 which is over the port 18 is removed, and a work holding cup 40 is substituted therefor. The crank 49 is then rotated to permit a quantity of substance 55, which for example, is flour, to sift through into the cup 40, and rest upon the transparent bottom 46. Any difference in color between the substances 55 and the standard substance 43 will affect the output of cell 20, causing an unbalance between the two cells 19 and 20 and vary the position of the needle 29.

The observer then adjusts the resistance 27 to restore the balance, bringing the needle 29 back to zero, and the adjustment or resistance which he supplies in ohms is read in terms of color values.

In other words, zero is an absolute and constant point and use is made of the value of the decade of resistance in ohms as a calibration value, and departures from zero are balanced or measured as accurately as resistance can be measured.

It must be observed that these measurements are taken at moments of zero potential, making it possible to calibrate the colors with the utmost precision.

Obviously, any predetermined numbers or values may be ascribed to the various portions of the color scale, being thereafter possible to return or to refer to a given color or shade in a very definite manner.

I am aware that color matching machines have been constructed in the past, and that photoelectric cells have long been employed for this purpose; but the device which I have described herein relates especially to color calibration and to a means for actually measuring departures from a fixed color standard and for ascribing values to these departures.

I claim:

A color calibrator consisting of a casing having a pair of ports in the top thereof, a pair of glass bottom material holding cups adapted to be removably placed over said ports, one of said cups containing a material which has standard reflecting properties while the other cup contains material to be compared with the standard, an adjustably mounted exciter lamp within said casing adapted to project light through the bottoms of both cups, a photoelectric cell mounted within said casing under each of said cups so as to receive light reflected from the material therein, resistance elements placed in series with said cells with a negative pole of one cell connected to the positive pole of the other cell, a galvanometer for indicating the flow of current between said cells.

FRED A. ROGERS.